United States Patent
Bochenek et al.

(10) Patent No.: US 9,889,714 B2
(45) Date of Patent: Feb. 13, 2018

(54) OVERHEAD VIEW FOR HITCH CONNECTION

(71) Applicant: Robert Bosch GmbH, Stuttgart (DE)

(72) Inventors: Jeffrey Allen Bochenek, Milford, MI (US); Jonathan Charles Diedrich, Carleton, MI (US); Mark Gehrke, Ypsilanti, MI (US); Gunter Rottner, Wixom, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/035,328

(22) PCT Filed: Nov. 18, 2014

(86) PCT No.: PCT/US2014/066060
§ 371 (c)(1),
(2) Date: May 9, 2016

(87) PCT Pub. No.: WO2015/074016
PCT Pub. Date: May 21, 2015

(65) Prior Publication Data
US 2016/0272024 A1    Sep. 22, 2016

Related U.S. Application Data

(60) Provisional application No. 61/905,666, filed on Nov. 18, 2013.

(51) Int. Cl.
*B60D 1/36* (2006.01)
*B60D 1/62* (2006.01)
(Continued)

(52) U.S. Cl.
CPC ............... *B60D 1/36* (2013.01); *B60D 1/06* (2013.01); *B60D 1/46* (2013.01); *B60D 1/62* (2013.01);
(Continued)

(58) Field of Classification Search
CPC ... B60D 1/36; B60D 1/06; B60D 1/46; B60D 1/62; B60Q 9/002; B60R 1/00
See application file for complete search history.

(56) References Cited

U.S. PATENT DOCUMENTS 6,663,132 B1 * 12/2003 Kizy ................. B60D 1/26
280/479.1
8,038,166 B1    10/2011 Piesinger
(Continued)

FOREIGN PATENT DOCUMENTS

| DE | 102012001380 | 8/2012 |
|---|---|---|
| EP | 1862050 | 12/2007 |

(Continued)

OTHER PUBLICATIONS

International Search Report and Written Opinion for Application No. PCT/US2014/066060 dated Mar. 24, 2015 (11 pages).
(Continued)

*Primary Examiner* — Anne Marie M Boehler
*Assistant Examiner* — Marlon A Arce
(74) *Attorney, Agent, or Firm* — Michael Best & Friedrich LLP

(57) ABSTRACT

Systems and methods for using a hitch connection system to attach a vehicle to a trailer. The hitch connection system includes at feast one camera and a controller. The camera is configured to collect snags data of a vehicle hitch and a trailer coupler. The controller is configured to generate an overhead view image based on the image data. The controller is farther configured to calculate a relative height between the vehicle hitch and the trailer coupler based on the image data and generate an alert when the relative height is less ton a predetermined threshold.

16 Claims, 5 Drawing Sheets

(51) Int. Cl.
  *B60R 1/00* (2006.01)
  *B60D 1/06* (2006.01)
  *B60D 1/46* (2006.01)
  *B60Q 9/00* (2006.01)

(52) U.S. Cl.
  CPC ............... *B60Q 9/002* (2013.01); *B60R 1/00* (2013.01); *B60R 2300/808* (2013.01)

(56) References Cited

U.S. PATENT DOCUMENTS

| | | | | |
|---|---|---|---|---|
| 2002/0125018 | A1* | 9/2002 | Bernhardt | A01B 59/068 172/439 |
| 2002/0149673 | A1* | 10/2002 | Hirama | B60R 1/00 348/118 |
| 2006/0255560 | A1 | 11/2006 | Dietz | |
| 2007/0024026 | A1* | 2/2007 | Overstreet | B60D 1/28 280/479.1 |
| 2008/0212215 | A1* | 9/2008 | Schofield | B60C 23/00 359/844 |
| 2010/0013188 | A1 | 1/2010 | Ortmann et al. | |
| 2010/0324770 | A1 | 12/2010 | Ramsey et al. | |
| 2013/0226390 | A1 | 8/2013 | Luo et al. | |
| 2014/0151979 | A1* | 6/2014 | Puckett | B60D 1/36 280/477 |
| 2016/0185170 | A1* | 6/2016 | McAllister | B60D 1/485 280/479.1 |

FOREIGN PATENT DOCUMENTS

| | | |
|---|---|---|
| JP | 2002359839 A | 12/2002 |
| JP | 2007523007 A | 8/2007 |
| WO | 2012103193 | 8/2012 |

OTHER PUBLICATIONS

Office Action from the Japanese Patent Office for Application No. 2016-532036 dated May 8, 2017 (5 pages).

* cited by examiner

OVERHEAD VIEW FOR HITCH CONNECTION

RELATED APPLICATIONS

This application claims priority to U.S. Provisional Application No. 61/905,666, filed on Nov. 18, 2013 and titled "OVERHEAD VIEW FOR HITCH CONNECTION," the entire contents of which is incorporated by reference.

BACKGROUND

Embodiments of the invention relate to methods and systems for aiding a driver in attaching a vehicle hitch to a trailer coupler.

Due to view and sight line limitations, it is difficult to connect a vehicle hitch with a hitch-mounted device or accessory (e.g., a trailer, another vehicle, a bike rack, a cargo carrier, etc.). For example, the vehicle towing ball needs to be properly aligned with a trailer coupler in a longitudinal (up-and-down) direction and a lateral direction (side-to-side). However, while operating a vehicle, the driver cannot directly see the towing ball or the trailer coupler.

SUMMARY

Accordingly, implementations of the invention provide methods and systems for providing an overhead view in a vehicle to allow a driver to align a vehicle hitch with hitch-mounted accessory. A distance between the vehicle hitch (e.g., the towing ball) and the mating trailer coupler can be determined based on the overhead image data. The distance information can be communicated to the driver and/or used by a controller to automatically control the vehicle.

The invention also provides a hitch connection system for attaching a vehicle to a trailer. The hitch connection system includes at least one camera and a controller. The camera is configured to collect image data of a vehicle hitch and a trailer coupler. The controller is configured to generate an overhead view image based on the image data. The controller is further configured to calculate a relative height between the vehicle hitch and the trailer coupler based on the image data and generate an alert when the relative height is less than a predetermined threshold.

In addition, the invention provides a method for aiding a driver in connecting a vehicle to a trailer. The method includes collecting image data of a vehicle hitch and a trailer coupler by at least one camera. The method also includes generating, by a controller, an overhead view image based on the image data. The method further includes calculating a relative height between the vehicle hitch and the trailer coupler based on the image data and generating an alert when the relative height is less than predetermined threshold by the controller.

Other aspects of the invention will become apparent by consideration of the detailed description.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As a result, it should be noted that a plurality of hardware and software based devices, as well as a plurality of different structural components may be utilized to implement the invention. For example, "control units" and "controllers" described in the specification can include processing components, including one or more processors, one or more memory nodules including non-transitory computer-readable medium, one or more input/output interfaces, and various connections (e.g., a system bus) connecting the components.

Figure 1:
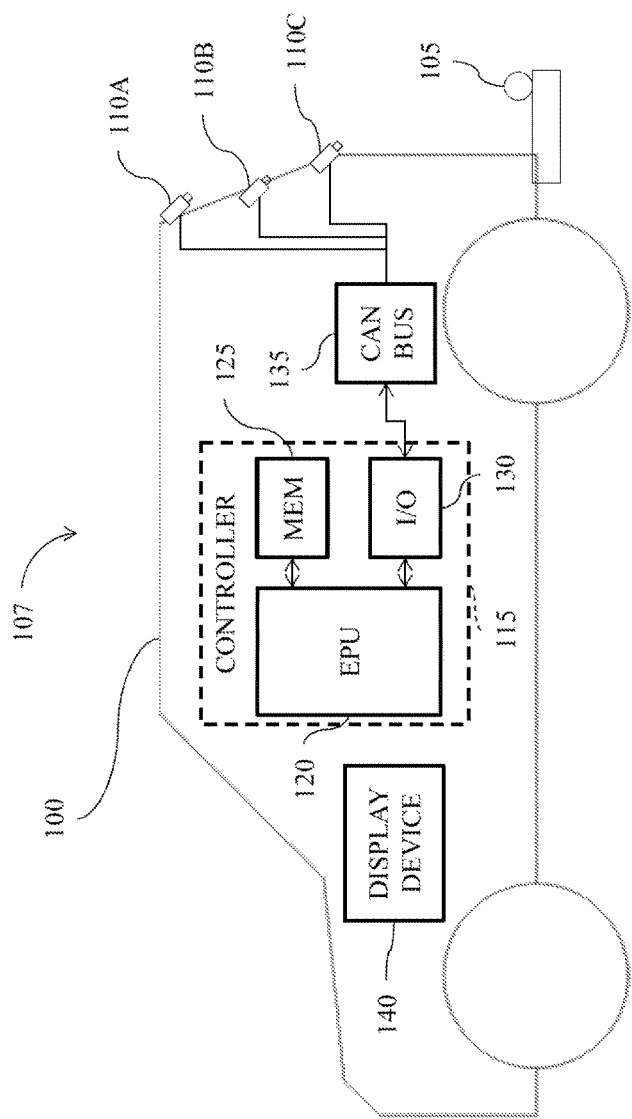
FIG. 1 is a diagram of a vehicle equipped with a hitch connection system.

FIG. 1 illustrates a vehicle 100 with a hitch 105 (e.g. towing ball) and a hitch connection system 107. The hitch connection system 107 includes a plurality of cameras 110A-110C mounted on the vehicle 100. Image data collected by the plurality of cameras 110A-110C is used to produce an overhead view of the vehicle 100. The hitch connection system 107 also includes a controller 115 having an electronic processing unit 120 (e.g., a processor, application specific integrated circuit ("ASIC"), etc.), a non-transitory computer-readable medium 125, and an input/output interface 130. The controller 115 obtains the image data through the input/output interface 130. For example, the input/output interface 130 can be connected to the plurality of cameras 110A-110C through a wired connection or a wireless connection. In some embodiments, the plurality of cameras 110A-110C are connected to the input/output interface 130 over a dedicated wired connection or communicate with the input/output interface 130 over a communication bus 135 (e.g., a CAN bus).

Figure 2:
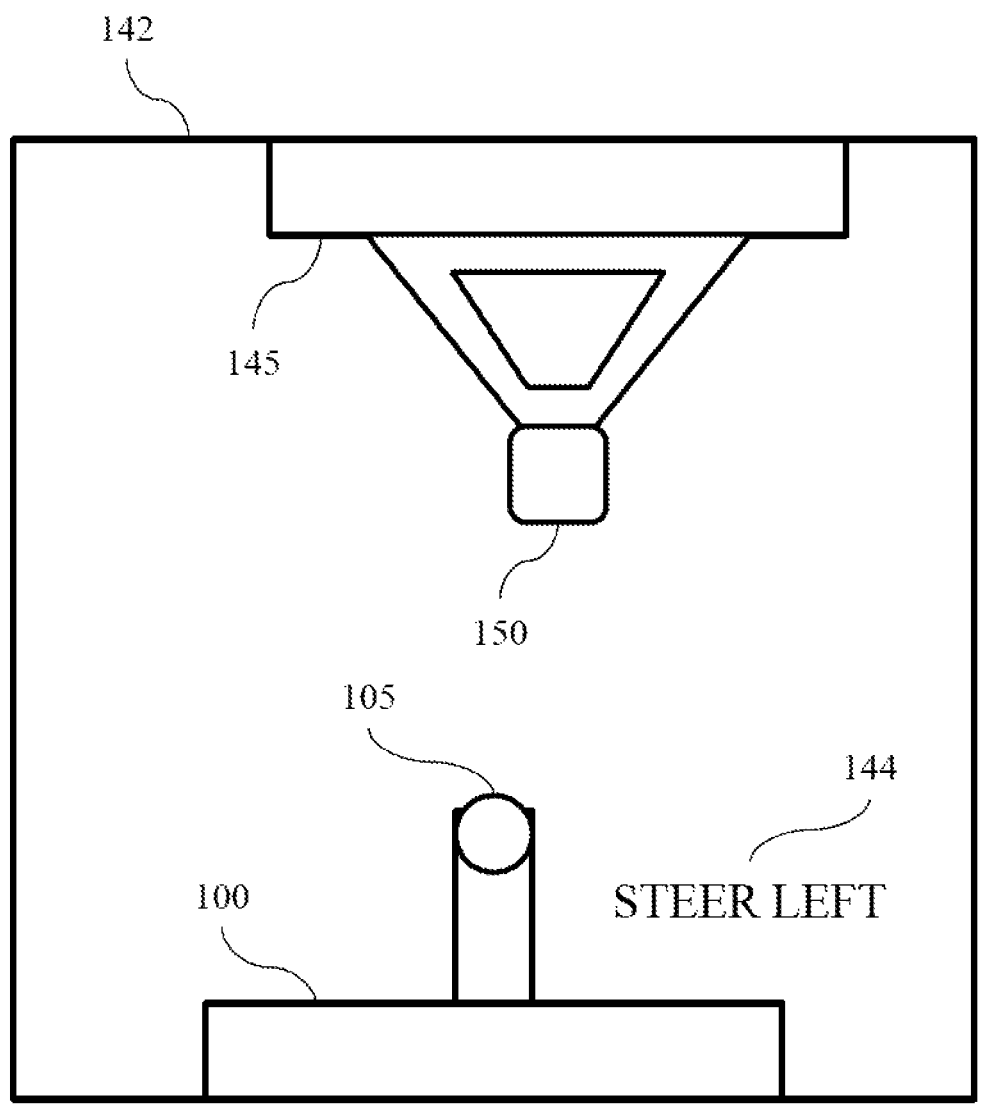
FIG. 2 is an overhead view image generated by the hitch connection system of FIG. 1.

The electronic processing unit 120 included in the controller 115 executes instructions stored in the non-transitory computer-readable medium 125 to generate an overhead view image 142 of the vehicle 100 as illustrated in FIG. 2. The overhead view image 142 can be displayed on at least one display device 140 included in the hitch connection system 107 (e.g., an LED, LCD, or touchscreen display). The overhead view image includes three-dimensional data of the vehicle 100 and its surroundings and can include one or more overlays. For example, in some implementations, the overhead view image 142 includes a vehicle overlay that indicates the position of the vehicle 100. The overhead view image 142 can also include overlays that highlight the hitch-mounted accessory (hereinafter referred to as a trailer 145, but such an "accessory" can include any object that can be towed by the vehicle 100, such as a trailer, another vehicle, a bike rack, a cargo carrier, etc.) and/or other objects detected around the vehicle 100. In some implementations, the overhead view image 142 can also include overlays that provide instructions 144 to the driver (e.g., arrows, warnings, textual commands or information, etc.).

Figure 3:
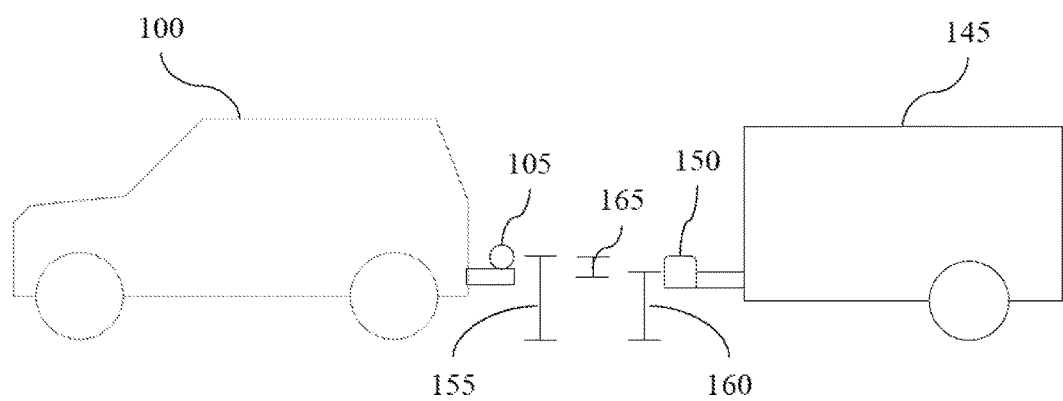
FIG. 3 is a diagram of a vehicle and a trailer.

FIG. 3 illustrates the vehicle 100 of FIG. 1 and a trailer 145 with a coupler 150. The controller 115 can also calculate distance information based on the overhead view image (i.e., based on the three-dimensional data represented in the overhead view image). For example, the controller 115 can determine a hitch height 155 of the hitch 105 and a coupler height 160 of the coupler 150 relative to the ground. In some implementations, the controller 115 determines a relative height 165 between the hitch 105 and the coupler 150. The controller 115 uses the relative height 165 to warn the driver when the hitch 105 may crash into the coupler 150 or other components of the trailer 145 (as compared to connecting with the coupler 150) so that the driver can take appropriate action. For example, the controller 115 can generate an audible warning, visual warnings, haptic warning, or a combination thereof to warn the driver of a possible collision.

In some implementations, the distance information is calculated based on the image data collected by the plurality of cameras 110A-110C. In some implementations, the distance information is calculated based on the image data and the overhead view image. In some implementations, the distance information is calculated based solely on the overhead view image.

In some implementations, the controller 115 is also configured to automatically operate the vehicle 100 to avoid a detected potential crash. For example, in those vehicles with active suspension, the controller 115 can be configured to automatically adjust the vehicle suspension height to avoid a collision. Alternatively or in addition, the controller 115 can be configured to automatically adjust a hitch height 155 of the hitch 105 (in vehicles equipped with an electronically adjustable hitch). In some implementations, the controller 115 can also be configured to perform similar height adjustments to level a load carried in the trailer 145 (e.g., automatically or based on manual commands). Also, in some implementations, the controller 115 is configured to automatically control the vehicle's steering angle and/or speed to help align the vehicle 100 with the taller 145 for connection.

To identify the hitch 105 and coupler 150 locations, the controller 115 can be configured to display one or more images (e.g., the overhead view image 142) to the driver and receive an indication from the driver of the location of the hitch 105 and the coupler 150. For example, if the vehicle 100 includes a display device 140, the controller 115 receives touch points on the display device 140 that indicate the position of the hitch 105 and/or the coupler 150. Alternatively or in addition, the controller 115 can automatically identify the hitch 105 and/or the coupler 150 using feature recognition. In some implementations, the controller 115 also uses prior location determinations to learn locations or improve feature recognition.

Figure 4:
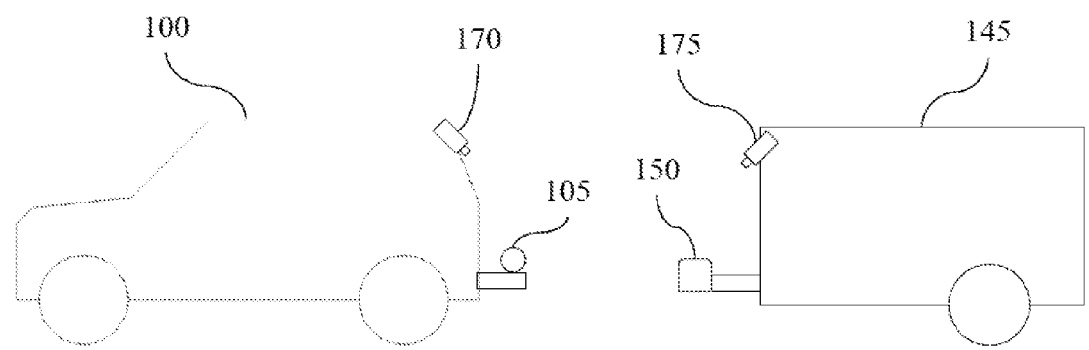
FIG. 4 is a diagram of a vehicle and a trailer equipped with a hitch connection system.

FIG. 4 illustrates a vehicle 100 including a wired camera 170 and a trailer 145 including a wireless camera 175. In some implementations, one or more wireless cameras can be used to aid a driver in connecting a trailer 145. For example, one or more wireless cameras can be placed at various locations on the vehicle 100 or the trailer 145 to obtain a desired a field-of-view not easily obtained using wired cameras. In some implementations, the wireless cameras are removable such that they can be used with different trailers and/or manually positioned based on the vehicle, the trailer, and the connection environment. Image data collected by the wireless cameras can be used with image data collected by wired cameras to produce the overhead view image. Alternatively or in addition, the image data collected by the wireless cameras can be kept separate from the image data collected by the wired cameras. Therefore, during operation, two different views can be provided. The particular view displayed to the driver can switch based on manual selections or automatically. For example, in one implementation, the controller 115 can provide a first overhead view when a driver is performing a trailer connection that is based on image data collected by the wired camera 170. When the trailer 145 is connected to or close to being connected to the vehicle 100, the controller 115 can automatically switch to a second overhead view that is based on image data collected by the wireless camera 175. For example, after the vehicle 100 and the trailer 145 are connected or shortly before such a connection occurs, the trailer 145 may block the view of one or more cameras mounted at the rear of the vehicle 100. Therefore, switching the wireless cameras can provide a better view for the driver when completing the connection.

Figure 5:
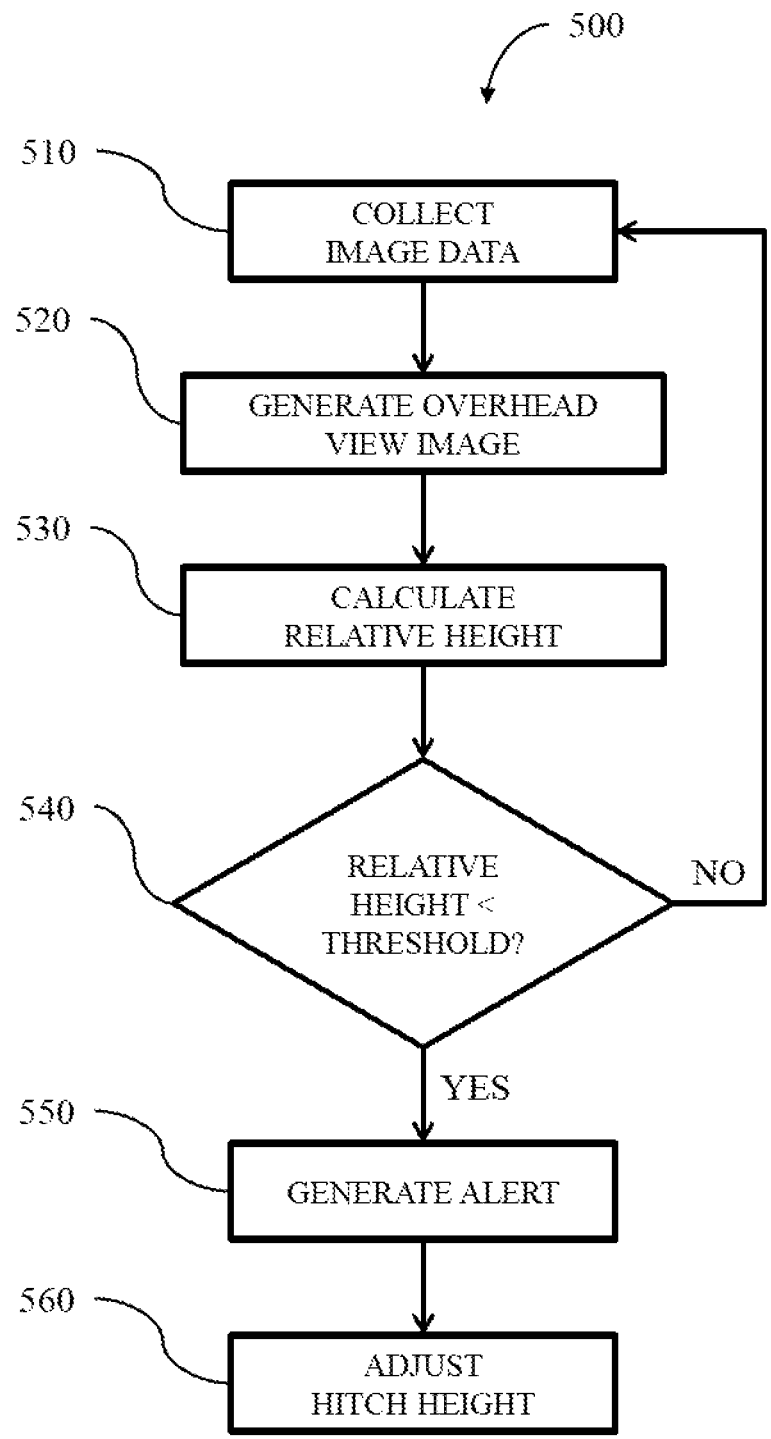
FIG. 5 represents a process for operating the hitch connection system of FIG. 1.

FIG. 5 illustrates a process 500 for operating the hitch connection system 107 to aid a driver in connecting a hitch 105 of a vehicle 100 to a coupler 150 of a trailer 145. The steps of the process 500 are described in an iterative manner fin descriptive purposes. Various steps described herein with respect to the process 500 are capable of being executed simultaneously, in parallel, or in an order that differs from the illustrated serial and iterative manner of execution. At step 510, the at least one camera collects image data of the hitch 105 and the coupler 150. At step 520, the controller 115 generates an overhead view image 142 based on the image data. At step 530, the controller 115 calculates a relative height 165 between the hitch 105 and the coupler 150. At step 540, the controller 115 compares the relative height 165 to a predetermined threshold. If the relative height 165 is greater than or equal to the predetermined threshold, the controller 115 determines that the hitch 105 is a safe enough vertical distance away from the coupler 150 and the process 500 returns to step 510 to collect new image data. On the other hand, if the relative height 165 is less than the predetermined threshold, the controller 115 determines that the hitch 105 may crash into the coupler 150, instead of mating with the coupler 150, and the process 500 proceeds to step 550. At step 550, the controller 115 generates an alert to warn the driver that the hitch 105 may crash into the coupler 150. At step 560, the controller 115 adjusts the height of the hitch 105.

Thus, the invention provides, among other things, a hitch connection system for a vehicle and a trailer. Various features and advantages of the invention are set forth in the following claims.

What is claimed is:

1. A hitch connection system for attaching a vehicle to a trailer, the system comprising:
    at least one camera configured to collect image data of a vehicle hitch and a trailer coupler; and
    a controller configured to
        generate an overhead view image based on the image data,
        calculate a relative height between the vehicle hitch and the trailer coupler based on the image data,
        generate an alert when the relative height is less than a predetermined threshold,
        adjust a hitch height when the relative height is less than the predetermined threshold, by
        adjusting a position of the vehicle hitch relative to the vehicle when the relative height is less than the predetermined threshold.

2. The hitch connection system according to claim 1, wherein the alert includes at least one selected from a group including an audible warning, a visual warning, and a haptic warning.

3. The hitch connection system according to claim 1, wherein the controller is further configured to adjust a vehicle suspension height when the relative height is less than the predetermined threshold.

4. The hitch connection system according to claim 1, wherein the controller is further configured to calculate the relative height based on the overhead view image.

5. The hitch connection system according to claim 1, wherein the controller is further configured to determine a hitch height and a coupler height based on the image data.

6. The hitch connection system according to claim 5, wherein the controller is further configured to calculate the relative height based on the hitch height and the coupler height.

7. The hitch connection system according to claim 1, wherein the at least one camera includes a first camera mounted on the vehicle.

8. The hitch connection system according to claim 7, wherein the at least one camera further includes a second camera mounted on the vehicle, and wherein the first camera is coupled to the controller via a wired connection and the second camera is coupled to the controller via a wireless connection.

9. The hitch connection system according to claim 7, wherein the at least one camera further includes a second camera mounted on the trailer.

10. The hitch connection system according to claim 9, where the first camera is coupled to the controller via a wired connection and the second camera is coupled to the controller via a wireless connection.

11. A method for aiding a driver in connecting a vehicle to a trailer, the method comprising:
    collecting, by at least one camera, image data of a vehicle hitch and a trailer coupler;
    generating, by a controller, an overhead view image based on the image data;
    calculating, by the controller, a relative height between the vehicle hitch and the trailer coupler based on the image data;
    generating, by the controller, an alert when the relative height is less than a predetermined threshold;
    adjusting, by the controller, a hitch height when the relative height is less than the predetermined threshold; by
    adjusting, using the controller, a position of the vehicle hitch relative to the vehicle when the relative height is less than the predetermined threshold.

12. The method according to claim 11, wherein the alert includes at least one selected from a group including an audible warning, a visual warning, and a haptic warning.

13. The method according to claim 11, further comprising adjusting, using the controller, a vehicle suspension height when the relative height is less than the predetermined threshold.

14. The method according to claim 11, further comprising calculating, the relative height based on the overhead view image.

15. The method according to claim 11, further comprising determining, using the controller, a hitch height and a coupler height based on the image data.

16. The method according to claim 15, further comprising calculating, the relative height based on the hitch height and the coupler height.

* * * * *